(12) United States Patent
Skrenta

(10) Patent No.: US 7,930,647 B2
(45) Date of Patent: Apr. 19, 2011

(54) SYSTEM AND METHOD FOR SELECTING PICTURES FOR PRESENTATION WITH TEXT CONTENT

(75) Inventor: Richard Skrenta, San Carlos, CA (US)

(73) Assignee: Topix LLC, Palo Alto, CA (US)

( * ) Notice: Subject to any disclaimer, the term of this patent is extended or adjusted under 35 U.S.C. 154(b) by 178 days.

(21) Appl. No.: 11/299,712

(22) Filed: Dec. 11, 2005

(65) Prior Publication Data

US 2007/0136680 A1    Jun. 14, 2007

(51) Int. Cl.
*G06F 3/048* (2006.01)
(52) U.S. Cl. ........ 715/788; 715/243; 715/780; 715/730; 707/748; 707/749
(58) Field of Classification Search .................. 715/730, 715/780, 500, 760, 764, 763, 781, 243, 788; 707/3, 104.1, 530, 4–6
See application file for complete search history.

(56) References Cited

U.S. PATENT DOCUMENTS

| | | | |
|---|---|---|---|
| 4,849,898 A | 7/1989 | Adi | |
| 5,060,155 A | 10/1991 | van Zuijlen | |
| 5,099,425 A | 3/1992 | Yuji et al. | |
| 5,128,865 A | 7/1992 | Sadler | |
| 5,297,042 A | 3/1994 | Morita | |
| 5,303,150 A | 4/1994 | Kameda | |
| 5,321,833 A | 6/1994 | Chang et al. | |
| 5,323,310 A | 6/1994 | Robinson | |
| 5,687,364 A | 11/1997 | Saund et al. | |
| 5,832,494 A | 11/1998 | Egger et al. | |
| 5,905,981 A * | 5/1999 | Lawler | 707/4 |
| 5,920,854 A | 7/1999 | Kirsch et al. | |
| 5,933,827 A | 8/1999 | Cole et al. | |
| 6,088,692 A | 7/2000 | Driscoll | |
| 6,173,298 B1 | 1/2001 | Smadja | |
| 6,175,830 B1 | 1/2001 | Maynard | |
| 6,256,623 B1 | 7/2001 | Jones | |
| 6,462,758 B1 | 10/2002 | Price et al. | |
| 6,647,410 B1 | 11/2003 | Scimone et al. | |
| 6,697,793 B2 | 2/2004 | McGreevy | |
| 6,701,307 B2 | 3/2004 | Himmelstein et al. | |
| 6,721,728 B2 | 4/2004 | McGreevy | |
| 6,741,981 B2 | 5/2004 | McGreevy | |

(Continued)

OTHER PUBLICATIONS

BBC News, "Google opens up 200 years of news", http://news.bbc.co.uk/go/pr/fr/-/2/hi/business/5317942.stm, 2 pages, (Sep. 6, 2006).

(Continued)

*Primary Examiner* — William L Bashore
*Assistant Examiner* — Sherrod Keaton
(74) *Attorney, Agent, or Firm* — Mahamedi Paradice Kreisman LLP

(57) ABSTRACT

One or more pictures may be selected for use with a text item, such as an article (news story, blog entry, online magazine) or post (e.g. informal blog entry). Pictures may be selected from a library, such as a collection of stock photographs. Stock photographs are pictures that are available for purchase and use. Information about the content of the picture may be identified. The text item that is to be supplied the picture may be also be analyzed in its content. A given picture from the collection is then programmatically selected based on the identified information about the picture and the text item. A presentation may be created based on the text item and the given picture that is selected.

9 Claims, 6 Drawing Sheets holds a bottle of Femara, a hormone blocker used for breast cancer rather than the chemo she formerly would have been given for her relatively large tumor, in San Antonio, Texas, Friday, Dec. 9, 2006. Guidelines recently adopted in Europe and similar ones unveiled this weekend at a conference in Texas will result in far fewer women getting chemotherapy in the future. (AP Photo/Eric Gay)

U.S. PATENT DOCUMENTS

| | | | |
|---|---|---|---|
| 6,757,740 | B1 | 6/2004 | Parekh et al. |
| 6,772,170 | B2 | 8/2004 | Pennock et al. |
| 6,823,333 | B2 | 11/2004 | McGreevy |
| 6,904,449 | B1 | 6/2005 | Quinones |
| 6,938,046 | B2 | 8/2005 | Cooke et al. |
| 7,072,963 | B2 | 7/2006 | Anderson et al. |
| 7,092,966 | B2 * | 8/2006 | McIntyre ............... 707/104.1 |
| 7,162,053 | B2 * | 1/2007 | Camara et al. ............ 382/100 |
| 7,231,405 | B2 | 6/2007 | Xia |
| 7,376,653 | B2 | 5/2008 | Hart, III |
| 7,383,499 | B2 | 6/2008 | Kraft et al. |
| 7,398,324 | B2 | 7/2008 | Brennan et al. |
| 2001/0003828 | A1 | 6/2001 | Peterson et al. |
| 2001/0025277 | A1 | 9/2001 | Hyldahl |
| 2002/0026349 | A1 | 2/2002 | Reilly et al. |
| 2002/0049727 | A1 | 4/2002 | Rothkopf |
| 2002/0078035 | A1 | 6/2002 | Frank et al. |
| 2002/0087599 | A1 | 7/2002 | Grant et al. |
| 2002/0089533 | A1 | 7/2002 | Hollaar et al. |
| 2002/0091671 | A1 | 7/2002 | Prokoph |
| 2002/0099700 | A1 | 7/2002 | Li |
| 2002/0116495 | A1 | 8/2002 | Hutten |
| 2002/0138331 | A1 | 9/2002 | Hosea et al. |
| 2002/0152245 | A1 * | 10/2002 | McCaskey et al. ......... 707/530 |
| 2003/0046311 | A1 | 3/2003 | Baidya et al. |
| 2003/0065643 | A1 | 4/2003 | Musgrove et al. |
| 2003/0135490 | A1 | 7/2003 | Barrett et al. |
| 2004/0193691 | A1 | 9/2004 | Chang |
| 2004/0205677 | A1 | 10/2004 | Hughes et al. |
| 2005/0102628 | A1 * | 5/2005 | Salesin et al. ............. 715/764 |
| 2005/0203970 | A1 | 9/2005 | McKeown et al. |
| 2006/0123329 | A1 | 6/2006 | Steen et al. |
| 2006/0248440 | A1 | 11/2006 | Rhoads et al. |
| 2007/0073777 | A1 * | 3/2007 | Werwath et al. .......... 707/104.1 |

OTHER PUBLICATIONS

Brooks, Rodney A., "Intelligence Without Reason", MIT Artificial Intelligence Laboratory, A.I. Memo No. 1293, 1-27 (1991).
Brooks, Rodney A., "Intelligence without representation", Artificial Intelligence 47, 139-159 (1991).
Brooks, Rodney A., "Elephants Don't Play Chess", Robotics and Autonomous Systems 6, 3-15 (1990).
Forbes.com, Reuters, "Key dates in the history of Google", http://www.forbes.com/business/businesstech/newswire/2004/04/29/rtr/353500.html, 3 pages, (Apr. 29, 2004).
Google Book Search: News & Views, "History of Google Book Search", http://books.google.com/googlebooks/newsviews/history.html, 3 pages (2006).
Google News from Wikipedia, http://en.wikipedia.org/wiki/Google_News, 3 pages, (2006).
Harnad, Stevan, "The Symbol Grounding Problem", Physica D 42: 335-346 (1990).
Juskalian, Russ L., "Google's evolution makes a great story", http://www.usatoday.com/tech/products/books/2005-09-11-google-book_x.htm, 3 pages, (Sep. 11, 2005).
Price, Gary, "Bye Bye Beta: Google News is a Beta No More", http://blog.searchenginewatch.com/blog/060123-142418, 4 pages, posted Jan. 23, 2006.
Schoppers, M. J., "Universal Plans for Reactive Robots in Unpredictable Environments", 8 pages (undated).
Searle, John R., "Minds, Brains, and Programs", unedited draft, Behavioral and Brain Sciences 3 (3): 417-457 (1980).
Shafer, Jack, "The new Google News site, news untouched by human hands", Slate Press Box Automated News, http://www.slate.com/id/2071499/, 2 pages, posted Sep. 24, 2002.
Sweney, Mark and Wray, Richard, "Google News archive opens window on history", http://business.guardian.co.uk/story10,,1866295,00.html, 1 page, (Sep. 7, 2006).
Vreeswijk, Gerard, "IACAS: an Implementation of Chisholm's Principles of Knowledge", extended abstract, 10 pages (undated).
Election/Restriction Requirement (Zand.P101) dated 01/08/08 in US Application 10/888,787, 5 pages.
Election/Restriction Requirement (ZAND.P101) dated Oct. 18, 2007 in U.S. Appl. No. 10/888,787, 7 pages.
Final Office Action (ZAND.P101) dated May 11, 2010 in U.S. Appl. No. 10/888,787, 50 pages.
Information Mining with IBM Intelligent Miner Family, Daniel S. Tkach, IBM, Feb. 1998, 30 pages.
Kevin S. McCurley, "Geospatial Mapping and Navigation of the Web," WWW10, May 1-5, 2001, ACM 1-58113-348-0/01/0005, 9 pages.
Labrou, et al., "Yahoo! as an Ontology—Using Yahoo! Categories to Describe Documents", Conference on Information ands Knowledge Management, Kansas City, 1999, 8 pages.
Non-Final Office Action (ZAND.P114) dated Dec. 30, 2009 in U.S. Appl. 11/864,882, 13 pages.
Non-Final Office Action (ZAND.P108) dated Nov. 10, 2009 in U.S. Appl. 11/567,691, 18 pages.
Non-Final Office Action (ZAND.P101) dated Jun. 25, 2009 in U.S. Appl. 10/888,787, 40 pages.
Non-Final Office Action (ZAND.P101) dated Sep. 17, 2008 in U.S. Appl. 10/888,787, 29 pages.
Non-Final Office Action (ZAND.P101) dated Feb. 6, 2010 in U.S. Appl. 10/888,787, 16 pages.
Schilit, et al., "Challenge: Ubiquitous Location-Aware Computing and the "Place Lab" Initiative," WMASH'03, Sep. 19, 2003, ACM 1-58113-768-0/03/0009, 7 pages.
Woodruff, "GIPSY: Automated Geographic Indexing of Text Documents" Journal of the American Society for Informaiton Science, 1999, 11 pages.
Yahoo!, Main Page, http://web.archive.org/web/20000229123340/http://www.yahoo.com/, archiving the Yahoo! main page from Feb. 29, 2000, 4 pages.

* cited by examiner

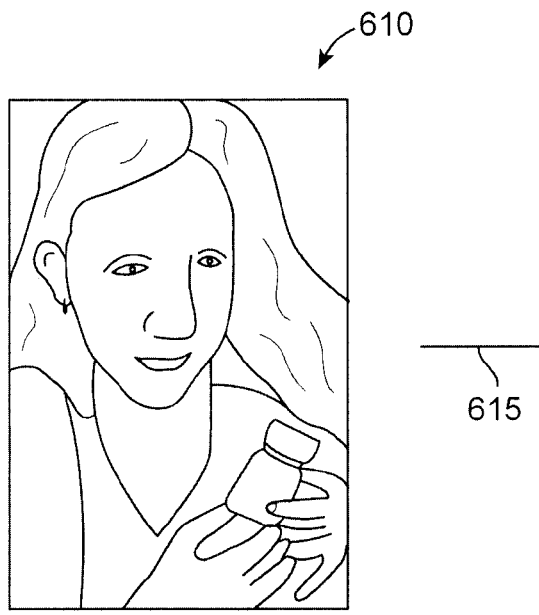

holds a bottle of Femara, a hormone blocker used for breast cancer rather than the chemo she formerly would have been given for her relatively large tumor, in San Antonio, Texas, Friday, Dec. 9, 2006. Guidelines recently adopted in Europe and similar ones unveiled this weekend at a conference in Texas will result in far fewer women getting chemotherapy in the future. (AP Photo/Eric Gay)

FIG. 6A

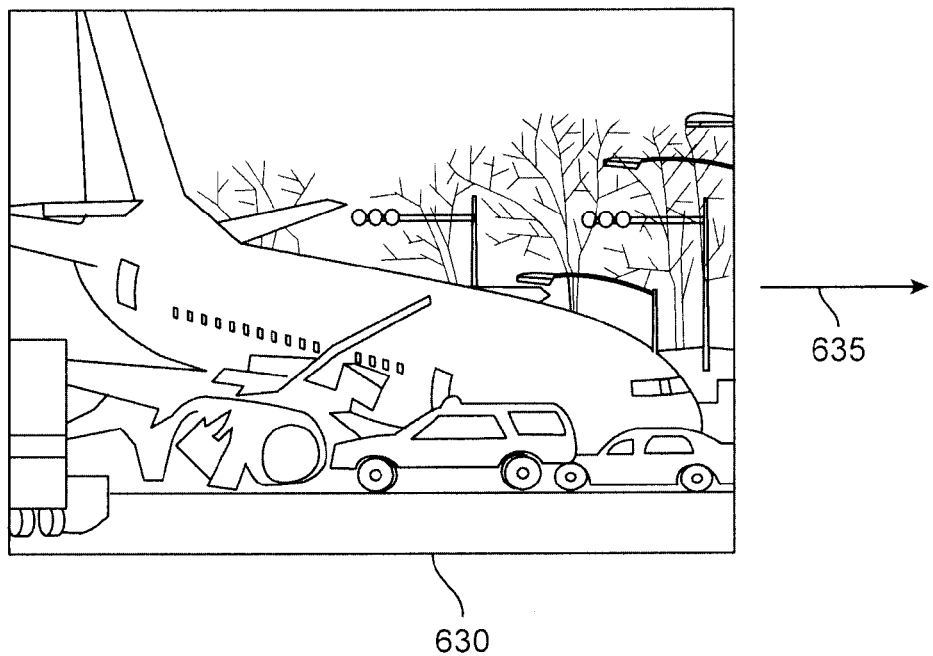

FIG. 6B

SYSTEM AND METHOD FOR SELECTING PICTURES FOR PRESENTATION WITH TEXT CONTENT

TECHNICAL FIELD

The disclosed embodiments relate generally to the field of computer-generated content. More particularly, the disclosed embodiments relate to a system and method for selecting pictures for use with presentation of text content.

BACKGROUND

Newspapers and magazines have over time developed an art of presenting text and pictures together on a page. In the print trade, careful consideration is provided to selecting images that compliment a story in subject matter, and even in style, color and presentation. This art has become lost with the migration of news and stories from newspapers and magazines to online web sites. Currently, little thought as to design and appearance is given to a web page on which news items or other articles are provided.

Numerous online sites exist that aggregate and present news and other articles. One common way of presenting articles and stories is to display summarizations. Sometimes, pictures are displayed with the summarizations. In order to review a complete story, an object appearing with the summarization, such as the image or the heading, needs to be selected by the user. In return, a text article may be opened.

BRIEF DESCRIPTION OF THE DRAWINGS

FIG. 6A and FIG. 6B illustrate attributes of pictures that can be used to select pictures for placement with articles on a layout of a document

DETAILED DESCRIPTION

Figure 1:
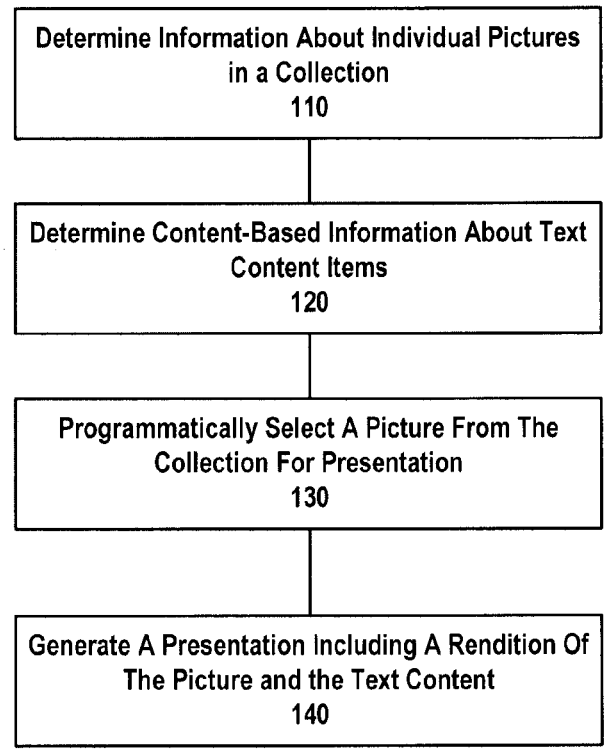
FIG. 1 illustrates a basic method for selecting pictures to appear with text-based content items, under an embodiment of the invention.

Embodiments described herein enable programmatic selection of pictures for use with text content items, such as online news stories and articles. In particular, one or more embodiments described herein provide for the selection of pictures for various text-based content appearing on web sites and other online sources. The pictures may be selected for purpose of enhancing the appeal of an article, news story, or online news site on which articles appear or are otherwise aggregated.

In particular, articles supplied on a web site or network location may be supplied or enhanced by the use of photographs that are selected through a computer-implemented process that takes into account information known about the content of the photograph and information that is known about the content of the article that is to be supplied the photograph.

According to one embodiment, one or more pictures may be selected for use with a text item, such as an article (news story, blog entry, online magazine) or post (e.g. informal blog entry). Pictures may be selected from a library, such as a collection of stock photographs. Stock photographs are pictures that are available for purchase and use. Information about the content of the picture may be identified. The text item that is to be supplied the picture may be also be analyzed in its content. A given picture from the collection is then programmatically selected based on the identified information about the picture and the text item. A presentation may be created based on the text item and the given picture that is selected.

In one embodiment, information identified about the text item and the individual pictures of the collection are category identifiers. Specifically, each article and picture is identified for its categories and sub-categories. As described with FIG. 4, for example, the category identification may correspond to the information that is used to programmatically select the given picture.

Other information, including metadata and layout information may also be used to select the given picture. In particular, one or more embodiments contemplate the use of rules to score, weight or disqualify pictures from being selected.

In addition to programmatic selection of the given picture, embodiments provide for identifying information about the text item and the individual pictures through programmatic analysis. One embodiment provides for use of text analysis to identify the information about the text item and the picture. With regard to the picture, text analysis may be performed on a caption provided with the picture.

The terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented through the use of modules. A module refers to a program, a subroutine, a portion of a program, a software component, firmware or a hardware component capable of performing a stated task or function. A module can exist on a hardware component such as a server independently of other modules, or a module can exist with other modules on the same server or client terminal, or within the same program. A module may be implemented on a client or on a server, or distributed between clients, servers, or amongst a client-server.

Furthermore, one or more embodiments described herein may be implemented through the use of instructions that are executable by one or more processors. These instructions may be carried on a computer-readable medium. Services and components illustrated by figures in this application provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Overview

FIG. 1 illustrates a basic method for selecting pictures to appear with text-based content items, under an embodiment of the invention. A method such as described may be implemented in various context, including at an online site where content items appear or are aggregated. A specific example of a site where a method such as described may be implemented include a news aggregation web site, or a blog. Alternatively, a method such as described by FIG. 1 may be implemented as, for example, a client, or as part of a integrated platform with a network site or resource.

In step 110, information is determined about individual pictures in a collection. The information determined may be of various types, including one or more of the following: (i) content-based information, (ii) layout and appearance information, (iii) metadata about the image file itself. The information about individual pictures may be determined manually or programmatically. In one embodiment, content-based information is determined from analyzing caption data that is provided with certain kinds of pictures. In particular, commercially available pictures, sometimes called "Stock Photos" are often provided with text-based captions that described what the picture is about. In one embodiment, the captions may be analyzed programmatically for key words and other information in order to determine a specific or general topic of the image, or alternatively, a topic that is pertinent to the picture.

Alternatively, the images of a picture may be analyzed through image recognition, for example, to determine a general topic of the picture. In one embodiment, face-recognition software may be used to identify the person appearing in a topic. For example, face recognition may be used to identify whether a picture is of "President Bush" or of a celebrity.

Layout or appearance data corresponds to information that describes how the picture will layout or otherwise appear on a web page or other forum. Examples of such information include a size of the image, an aspect ratio of the image, and/or one or more dominant hues appearing in the image. A human editor may inspect images to manually enter the information. Alternatively, software can be used to determine such information, including pixel-by-pixel scans of images to determine hue dominance.

A specific type of layout information is slant information. Generally, slant information describes a general directional orientation of an image, or dominant objects appearing in the image. For example, the direction a person is facing in an image, or the direction of action (e.g. a ball being thrown) is taken into account.

Various types of metadata about the image file may be obtained and used. One metadata is an identifier of the image file corresponding to the picture. An identifier may assist in determining the topic of the picture, or whether the picture or an equivalent has previously been used. Metadata may also refer to a size of the image, how many pixels it contains, a date it was created, a source of the image, or where it was last used. Some or all of this information may be used when rules governing usage of pictures in specific situations are implemented (see FIG. 5).

While various types of information may be determined when a picture is analyzed, one embodiment contemplates identifying, at least primarily, content-based information, such as a topic, category, or relevance of the image to other content. Other information, such as layout information, may be ancillary to the determination of content-based information. For example, if "President Bush" is identified from the caption of a picture, or through face-recognition of the picture, the category assigned to that picture may be that of "President Bush" and perhaps "U.S. Politics" or "Current Events".

In step 120, content-based information about a set of text content items is determined. Specific examples of text content items include news articles, web blogs and journals, or even emails or message posts. Content-based information may be determined programmatically, manually through a combination thereof. When performed programmatically, the analysis may be performed with simple or more complex algorithms. An example of a simple algorithm may correspond to a key word analysis of a headline or title of the item. An implementation that uses a more sophisticated analysis may perform one or more of the following: (i) key word analysis of the entire article, (ii) commonality analysis on key words or other words appearing in the article, and/or (iii) proximity of words to beginning of article ("proximity analysis").

In an embodiment, the content-based information from a given text content item may be determined from a source of the content item (e.g. the word "bike" on an article appearing on a web site about bicycles may be assumed to mean "bicycle"), as well as an estimate of the significance of the article from the number of other sites that display the same or similar article (e.g. important news of the day). Under one embodiment, a method such as described by FIG. 1 and elsewhere in this application may be performed in the context of a system such as described by U.S. Application Ser. No. 10/888,787, entitled SYSTEM AND METHOD FOR AUTOMATING CATEGORIZATION AND AGGREGATION OF CONTENT FROM NETWORK SITES, filed Jul. 9, 2004; the aforementioned application being incorporated by reference herein. Specifically, text-based content (including text provided with captions) may be analyzed for information about its content, including the topic, category or categories, and sub-categories, using techniques such as described in the aforementioned application.

In step 130, a picture is selected from the collection for a particular text content item based on information determined from the image and information determined from the text content item. According to an embodiment, the selection may be performed programmatically. In one embodiment, information about the text-content item is used to generate a query or search of an index containing information about individual pictures in the collection. A "best" or "optimal" picture may be selected based on a variety of factors, including a closeness in the match between information about what the picture is about and what the text content item is about. For example, a picture may be a best fit for a text content item if both the selected picture and the text content item are deemed to be pertinent to a specific sub-category.

Step 140 provides that a rendition of the selected picture and the text content item is generated. According to one embodiment, the rendition is a reduction of the original image. For example, a thumb-nail of the original selected picture, or a reduced size of the image, rescaled for a particular aspect ration or dimension, may be used. In one embodiment, the text content item may be in the form of a summarization. For example, if the text content item is an article, the rendition may provide a headline, byline, and/or first paragraph of the text content item. One environment contemplated for the rendition is an online site that aggregates text content items and displays them with photographs, including stock photos. Thus, the rendition may be web-based, and renderable through a browser.

Selecting Stock Photographs for Articles

Figure 2:
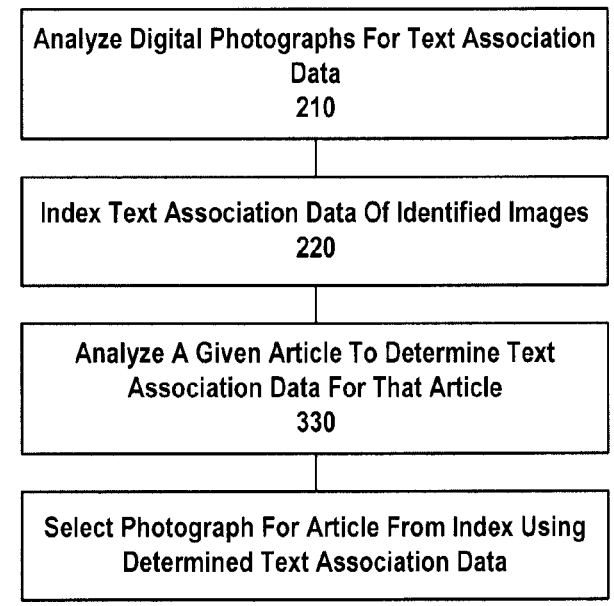
FIG. 2 illustrates a more specific embodiment in which stock photographs are selected for articles, under an embodiment of the invention.

FIG. 2 illustrates a more specific embodiment in which stock photographs are selected for articles, new stories and other text content items (collectively "articles"), under an embodiment of the invention. In step 210, digital photographs from a library of collection may be analyzed for text association data. Text association data may refer to any data that can be used to develop an association between the particular photograph and an article or other text content item. The content of the photographs may form the primary basis of the analysis, although as described with other embodiments, other information such as layout, appearance (e.g. color) and metadata may also be used.

In one embodiment, photographs used in step 210 include stock photographs. Such photographs may be purchased from providers and libraries, and often come with text-captions that describe a topic or subject of the image. According to one embodiment, analysis of stock photographs and other images with text captions may be performed using the text captions. A text analysis, such as keyword identification may be performed in order to determine text association data. Such text analysis may be performed through programmatic and/or manual means.

Step 220 provides that an index or other data structure is provided for text association data identified from images. The index may be searchable to queries that specify one or more key words. Index nodes that match the key words of the query may relate to photographs that were the basis of the node's key word(s).

In step 230, a given article is analyzed to determine text association data for that article. As mentioned, the article may be analyzed using key word, commonality and proximity analysis, such as described above with other embodiments. Analysis of articles and other text content may also be performed programmatically, and/or manually. An example of text association data is an identified category of the article. For example, a news item may be scanned and identified as having a category of "Sports" and/or "Football". An example of categories, and sub-categories for a scanned article is shown with FIG. 4.

Once text association data from a given article is determined, step 240 provides that one or more photographs from the collection are selected for the given article. The selection of the photographs may be performed by referencing text association data identified from the article with the index generated from the images in order to identify index nodes that match or have the best match to the text association data determined from the given article. Thus, in the example of "Football" provided above, the index may be searched for nodes that match or are the closest match to Football. The photograph associated with the selected index node is the selected photograph.

In step 250, a presentation may be created that comprises the rendition of the photograph and of the article. For example, the presentation may be provided as part of a web page, using renditions that are reductions or thumb-nails of the selected photographs, and/or summarization of the articles. Each of the renditions may be selectable through user-action to open a link and enable the user to view the larger image, a story relating to the image, and/or the story from which the summarization was created. Alternatively, the entire article, or substantive portions thereof may be presented, with larger or even full size pictures.

System Description

Figure 3:
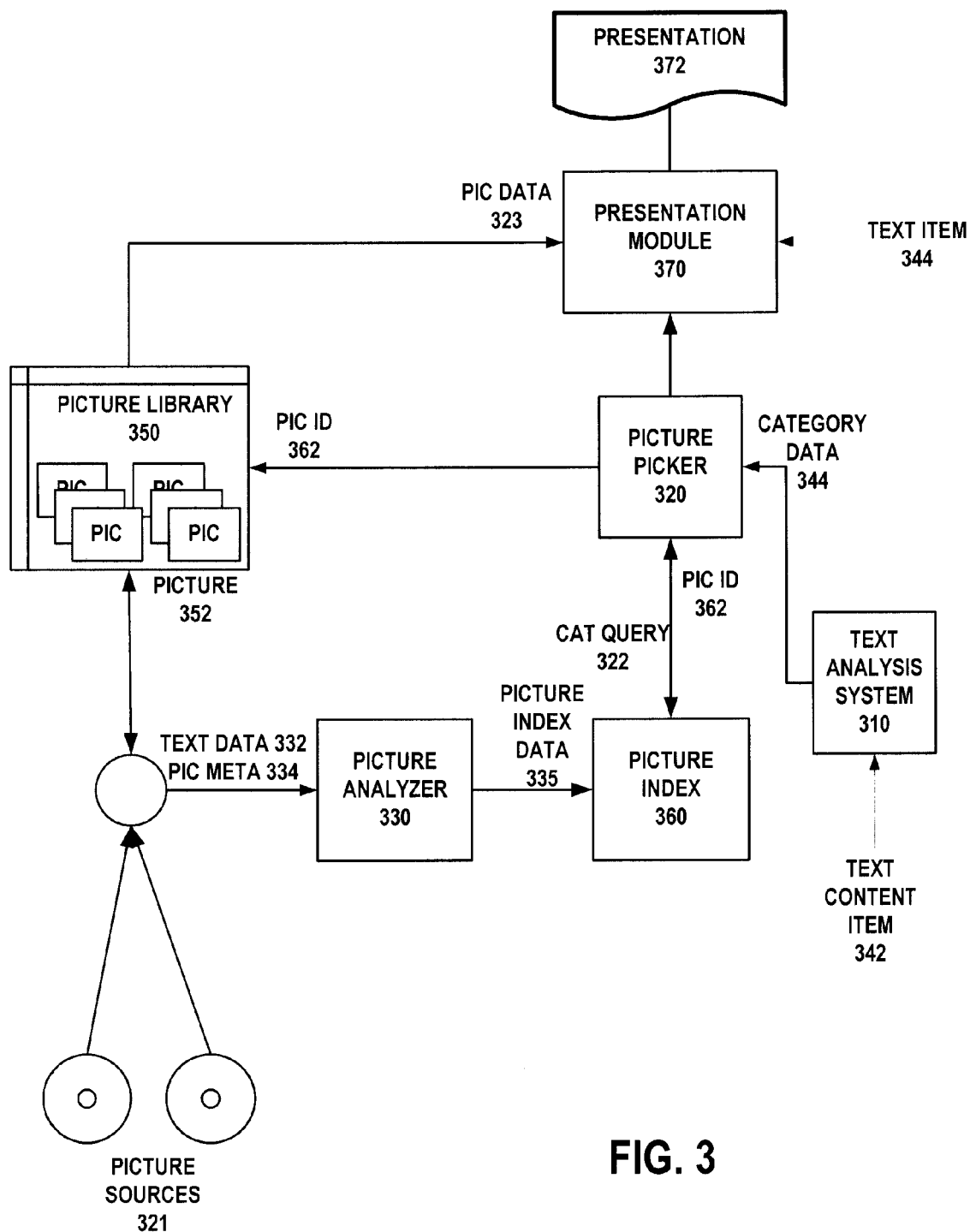
FIG. 3 illustrates a system for selecting photographs and other images for use with text-based content, according to an embodiment of the invention.

FIG. 3 illustrates a system for selecting photographs and other images for use with text-based content, such as articles, according to an embodiment of the invention. A system such as shown by FIG. 3 may be used to implement any embodiment described herein, including embodiments described with FIG. 1 and FIG. 2. In an embodiment shown by FIG. 3, a system include a text analysis system 310, a picture picker 320, a picture analyzer 330, and a presentation module 370. The picture analyzer 330 may be used to analyze and/or facilitate the manual analysis of images from various sources 332, including external libraries, such as those that retail or license stock photographs for online use. Sources may include online picture libraries that provide stock photographs and other imagery. Alternatively, the source of images analyzed may be from an internal library.

Likewise, the text analysis system 310 receives text-based content items ("articles") 342 from one or more sources. In one implementation, a system shown by FIG. 3 is implemented for an online environment, and articles are retrieved from various network locations on the Internet, such as news sites and blogs. To this end, text analysis system 310 may employ programmatic mechanisms to retrieve and analyze articles, to sort articles, and to categorize or otherwise obtain information for categorizing such items. Other functions that can be performed by the text analysis system 310 include identifying particular articles that are worthy for presentation on a given web page and at a particular time. For purpose of description, an embodiment of FIG. 3 assumes that article 342 is an article that is selected for display. Further, one result of the analysis performed is that text association data is identified. In an embodiment shown, the text association data is category data 344. Category data 344 identifies one or more categories for the particular article 342. The categories may correspond to topics, sub-topics, genres etc. Identification of what categories are to be assigned to the article 342 is based on an understanding of the content in the article. As mentioned elsewhere, category data 344 is based on a manual and/or programmatic understanding of the content of the article 342.

Figure 4:
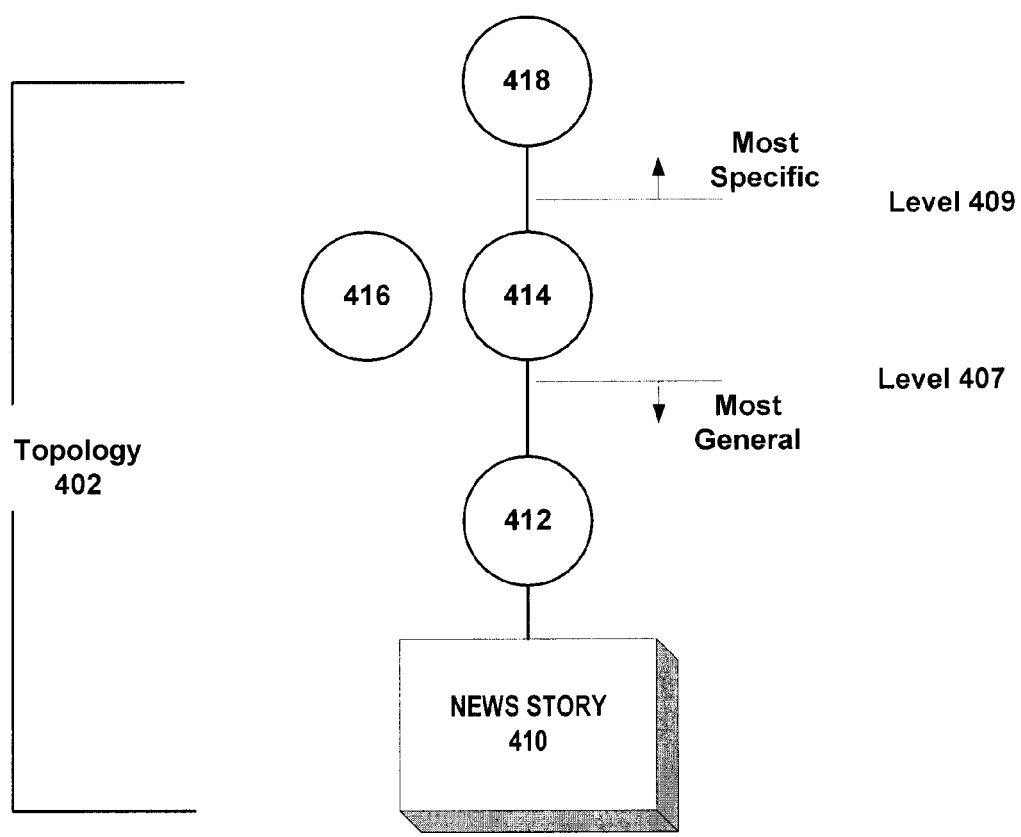
FIG. 4 illustrates a category topography for use in selecting pictures for articles, under an embodiment of the invention.

In an embodiment, a system such as shown by FIG. 3 employs a category topology. One category topology includes a first level of general categories, and each general category includes one or more sub-categories, and possibly sub-categories thereafter, such that the topology has two or more levels. A more detailed description of a category topology is shown by FIG. 4.

Independent of the text analysis system 310, a picture library 350 may be populated by pictures 352, such as stock photographs. For each picture 352 in the library 350, information for use in matching pictures to text is extracted or identified. In one embodiment, the information is identified at least in part through a program or module, although manual identification of such information may also be performed. The picture analyzer 330 is the component that performs the functions of programmatically identifying information (i) text association data 332, and/or (ii) picture metadata 334. Text association data 332 may pertain to the subject of the picture. Picture metadata 334 may pertain to information about the picture, such as the size of the image, the aspect ratio etc. If pictures 352 are provided from the sources 321 with text-captions, the text association data 332 may be determined from analysis of the captions. The picture analyzer 330 may use a similar algorithm to the text analysis system 310 in analyzing captions. Alternatively, given captions are relatively short, key word analysis on the title or contents of the caption may be used. As mentioned, manual analysis may also be invoked in which editors provide various kinds of information about the image. More sophisticated image analysis tools and/or human analysis may be used to also identify layout information, including, for example, the slant or orientation in a given picture.

Information identified by the picture analyzer 330 (if used) or through any other manual process may be referred to as picture index data 335. Picture index data 335 is provided to a picture index 360. Picture index 360 may correspond to any data structure that can hold information (such as picture index data 335) in a searchable and/or retrievable form.

The picture picker 320 receives the category data 344 from the text analysis system 310. In one embodiment, the picture picker 320 uses this input to select pictures for the article 342 that was analyzed. In one embodiment, the picture picker 320 formulates a query 322 or selection criteria that corresponds to or is based on the category data 344. From picture index 360, the picture picker 320 receives identifiers 362 to individual pictures in the library 350. The picture identifier 362 is used to retrieve picture data 323 for the picture identified from the query 322. In one implementation, the picture identifier 362 is provided to the presentation module 370, which uses the identifier to query the library 350. The presentation module 370 in turn receives picture data 323, corresponding to image data from the selected picture. The presentation module 370 also formulates or receives the article 342 from which a summarization or other rendition may be created (if the entire text article or substantive portions of it is not to be displayed). The presentation module 370 then generates the presentation 372.

Under one embodiment, the presentation 372 is in the form of thumb-nails or reduced versions of stock photography, placed in association with summarizations of articles. In another embodiment, the presentation 372 may correspond to a computer generated layout resembling a newspaper, where portions of articles are combined with imagery and photographs, including some selected by the picture picker 320. To this end, the entire article, or substantive portions of it (e.g. 50% or more) may be displayed richly in association with the selected picture.

As mentioned, a system such as shown in FIG. 3 may be implemented at least in part, or substantially, through use of computer-implemented processes, modules and components. In one embodiment, the system is a service, operating at a web site, and providing one or more presentations 372 as web pages within the web site.

Selection Criteria

According to one embodiment, category identification of pictures and text is at least a primary basis of selecting individual images 352 from the library 350 in connection with articles 342. In particular, an embodiment utilizes multi-level category matching to match pictures from the library 350 with articles 342.

FIG. 4 illustrates a category topography for use in selecting pictures for articles, under an embodiment of the invention. In FIG. 4, a news story 410 is assumed to be the article. The content of the news story 410 may be analyzed to determine a category topography 402. The category topography 402 include levels 407, 409, progressing from most general to most specific. In the example provided with FIG. 4, two levels 412, 414 are provided, although more or fewer levels may be used. Category 412 may correspond to the broadest identified category for news story 412, categories 414, 416 may be specific to one or more level, and category 418 may be most specific category, separated by two levels from the broad category 412.

Each sub-category 414, 416 and 418 may have a lineage defining that categories relationship with the broadest category. For example, the lineage of sub-category 416 is category 414 and category 412. The lineage of both category 414 and category 416 is category 412.

Based on such a topography, selecting a picture for a given article may be performed in the following manner. A master topography may be created, listing all categories that are known to the system, as well as relationships between individual categories. The relationships between individual categories may include lineage information. The text of the news article 410 is analyzed to determine its category topography. This may entail identifying a primary topic of the article 410, where the primary topic is already a category in the master topography. As assumption may be made that the primary topic is the most specific category for that news item. An upward lineage may be established for that category based on the master category topography.

Individual pictures of a collection may be analyzed to determine categories and sub-categories that are to be associated with the picture, given the master category topography already in place. As mentioned, the analysis of pictures may involve manual or programmatic analysis. Programmatic analysis may include text analysis of a caption provided with the picture (such as the case with stock photography) and/or recognition of faces or other objects appearing in the image. For example, a picture may be analyzed through its caption or through face-recognition to programmatically realize that the picture is of President Bush. The category of "President Bush" is matched in the master topography. Furthermore, one embodiment provides that other categories, or a lineage of categories, may be identified based on the identification of the specific category of "President Bush". These other categories may include, for example, "U.S. Politics", "Current Events" and "U.S. News". In the example provided, "U.S. News" may serve as the broadest category, and "President Bush" may serve as the most specific category.

The process of selecting a picture based on the category topography of the given news item may be performed by first determining if a picture exists in the library 350 that has the same category identification. If such a picture exists, that picture may be selected, subject to other rules or conditions. With reference to FIG. 4, one condition that might disqualify a picture from being selected is that if the picture is associated with more than one category of the same level, or has additional level categories. In such cases, the picture may not carry the message of the text.

One protocol or technique for selecting a picture is to identify the picture or pictures having the same most specific category and the same lineage to that category. In the example provided by FIG. 4, this would correspond to category 412-category 414-category 416. If such a picture does not exist, then the next most specific category may be used to find the match: category 412-category 414. For example, one protocol may always start with a mid-level category (e.g. category 414) in the category lineage of the news story 410.

Numerous other protocols and techniques may be employed to match a picture to an article. For example, if more than one picture is a possible match, scoring may be used, where the scoring is based on other criteria, such as hue, date of creation etc.

Rule Usage

Using categories to match pictures to text articles is an example of a technique that matches pictures to text based on each of their respective contents. According to an embodiment, content matching is not the only criteria by which pictures are selected for articles. Content matching (using category lineage, for example) may result in identification of candidates of pictures for each news item. Another set of rules, conditions, and algorithms (collectively referred to as "rules") may be used to identify the best match.

According to one or more embodiments, rules may be implemented in connection with a process for picking pictures for purpose of determining or influencing what pictures are used with a given article. Specific ways in which rules may be used include the following: (i) A rule may disqualify a picture that would otherwise be suitable or even ideal from being displayed with a given article, (ii) a rule may be used to aid in scoring or weighting pictures that would otherwise be appropriate for selection with the article, (iii) a rule may select a picture from a set of otherwise equally acceptable pictures for use with a given article or text item.

Specific examples of rule usage for selecting amongst candidate pictures includes the following:

(i) If a picture was recently used (e.g. within a given duration), it should not be used again until the given duration is over. This rule may have different variations, and it may be applied universally, for a specific web page in a web site, for a given geographic region, or alternatively for a specific user (based on login or cookie information).

(ii) Amongst two or more equally good candidate pictures, use the picture that was most recently taken or created. For example, if an article is about a celebrity, numerous stock photographs of that celebrity may exist. The rule would dictate that the most recent picture should be used.

Both of the aforementioned rules may implemented using metadata associated with the candidate pictures. However, content specific rules are also possible. For example, if the article is identified as being about death (e.g. the death of a celebrity), then a rule may be applied which dictates that the picture selected must be a head shot. Thus, for example, a celebrity shot of a singer in a concert would not be inappropriately used when the story is about that singer's death.

Figure 5:
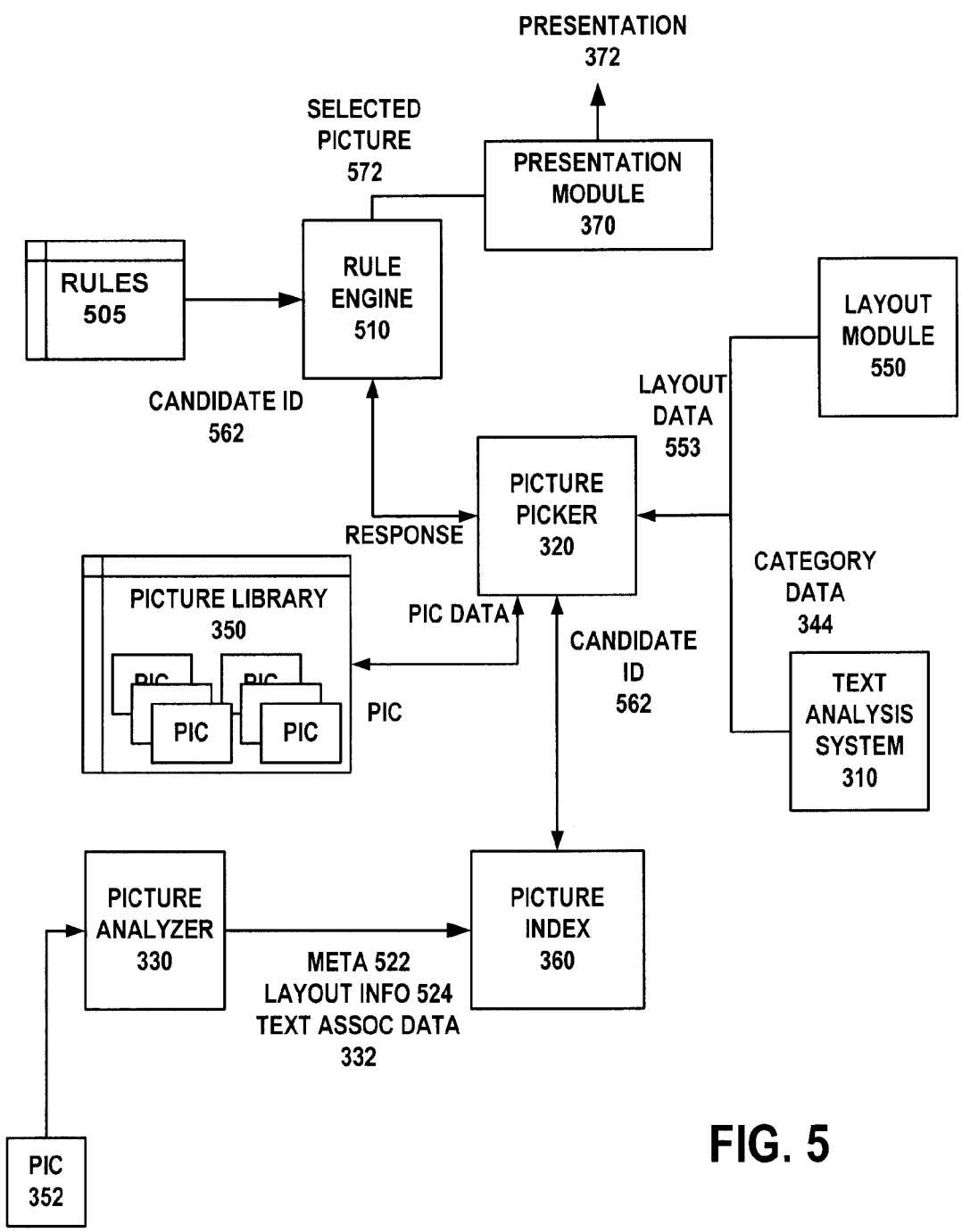
FIG. 5 illustrates a system in which pictures are selected for use with articles, when rules and other conditions are taken in to account, according to an embodiment of the invention.

FIG. 5 illustrates a system in which pictures are selected for use with articles, when rules and other conditions are taken in to account, according to an embodiment of the invention. A system such as shown by FIG. 5 represents a modification to a system such as shown by FIG. 3. As with FIG. 3, the picture picker 320 receives input in the form of category data 344 from the text analysis system 310. The picture index 360 provides a structure for picture index data 335, using a programmatic or manual component (e.g. picture analyzer 332). The modification provided by a system such as described in FIG. 5 includes using a rule engine 510, and a layout module 550. The rule engine 510 may use a set of rules 505. In addition to text association data 332, picture analyzer 330 (or alternative manual entry) also procures metadata information 522 and layout information 524 which in one implementation, is provided in the picture index 360.

In addition to input in the form of category data 344 from the text analysis system 310, the layout process or module 550 may formulate a template or layout for the presentation 372 (FIG. 3). Alternatively, the layout module 550 may identify the desired size, shape or orientation of a selected picture. As such, the layout module 550 may generate layout data 553 which specifies a location of a given article 342, as well as a required (or preferred) size, shape or aspect ratio of the picture that is to be selected. For example, if the presentation that is to be generated is to be in the form of a web page, the layout module 550 may identify the size that is to be dedicated to the article summarization and picture (which shall be reduced). For example, the size of the picture may be pre-designated, based on, for example, (i) the title appearing on the page, (ii) the space dedicated to print, and (iii) the arrangement presented and the total amount of real-estate that is to be dedicated to a particular image. Still further, the article that is to be displayed (or its summarization) may already exist with a particular picture, and the process of selecting a new picture includes replacing the existing picture, meaning the dimensions of the selected picture are to conform to the dimensions of the picture that was previously in place. As such, the layout data 553 may carry the shape (e.g. square, portrait or landscape) or size of the space that is to be provided the picture. Alternatively, the layout data 553 may determine whether the selected picture is to appear to the left or to the right of the selected article.

Accordingly, in a system shown by FIG. 5, the picture picker 320 queries the picture index 360 and selects identifiers of candidate pictures 562 in response to receiving the category data 344. Along with identifiers of candidate pictures 562, picture picker 320 also procures metadata information 522 and layout information 524. The layout information 524 is information for matching the characteristics and properties of the picture (e.g. shape, size, orientation, slant direction) with the layout desired for the selected picture (as defined by layout data 553). Under one implementation, a combination of the metadata information 522 and/or layout information 524 is used by the rule engine 510. For example, metadata information may disqualify a candidate picture because it was too recently used. In addition to metadata rules such as discussed, the layout information 524 may also be used to weight, score or disqualify pictures, depending on the implementation and the specifics provided from the layout module 550. Layout information 553 may include, for example, color hues, size, aspect ratio, and directional slants in the picture. The layout module 550 may indicate, through layout data 553, a preference for square pictures, for example, since rectangular pictures may appear awkward. If the space that is to be filled on a page has a known dimension, the layout data 553 may specify this information. The rule engine 510 may disqualify or discount pictures that, based on the layout information 524, cannot be extrapolated to the dimensions of the available space. For example, a picture that is rectangular and portrait may not scale well into an available space that is rectangular and landscape, and the rule engine may discount or disqualify an otherwise good picture for the space based on the amount of contortion, cropping, or scaling that needs to be performed in order to present that picture. With regard to directional slants, proper picture placement provides for the grain of the picture's slant to be directed in the direction of the text content. If layout data 553 dictates the picture position to be in conflict with the layout information 524 (procured from the picture), the picture may lose scoring or be disqualified. However, an alternative may be that another layout arrangements may also result to accommodate the layout of the selected picture.

Under one embodiment, a result of the rule engine 510 processes is that one of the candidate pictures is selected. The rule engine 510 may signal the identifier of the selected candidate 572 to the presentation module 370, which may also use the layout data to arrange the resulting presentation.

Presentation Appearance

FIG. 6A and FIG. 6B illustrate attributes of pictures that can be used to select pictures for placement with articles on a layout of a document (electronic or otherwise). With regard to FIG. 6A, a picture 610 is shown having a caption 620. The caption 620 includes several sentences. Certain information about the content of the picture may be identified by a human editor. This may include, for example, "woman", "face", "medicine" and "medical equipment". A human editor may also rely on the caption 620 to determine that the picture pertains to "breast cancer". The picture analyzer 330 (see FIG. 3) or other programmatic component may provide a similar analysis through key word identification and intelligence. For example, the programmatic mechanism may identify the picture as being about "Femara" and "breast cancer". In either case, the information identified for categories that the picture can be assigned to. The identified categories may form, for example, the text association data 332 (FIG. 4).

In addition to category identifiers and other information about the content of the picture, layout information may be identified. Example of the layout information may include the aspect ratio, a labeling that the picture is dark, and the picture quality. One other layout information is a slant orientation 615. The face presented has a rightward direction, which is the slant orientation 615. This information may be used to indicate that the picture is best presented to the left of a text item or block.

Additional metadata information may also be identified from the picture (e.g. date created, source of picture) and used in connection with other metadata associated with the picture. For example, after the picture is used, a system such as described with FIG. 3 may create and associate metadata with the picture to indicate the picture's last use. The system may then implement a rule in which the picture is to not be used again, or at least for a given duration of time.

In FIG. 6B, no caption is presented, but the image may be analyzed to identify categories that include "disaster", "airplane" and "airplane crash". The layout information provided for the picture may identify a rightward slant 635.

Figure 7A:
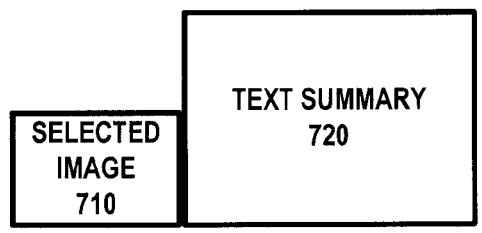
FIG. 7A to FIG. 7C illustrate different examples of presentation layouts in which selected pictures may appear with text items.
Figure 7B:
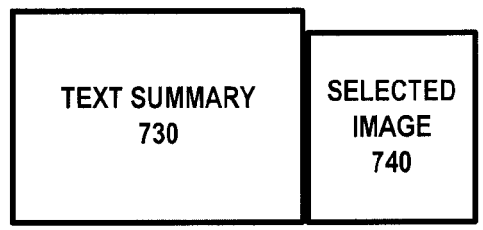
Figure 7C:
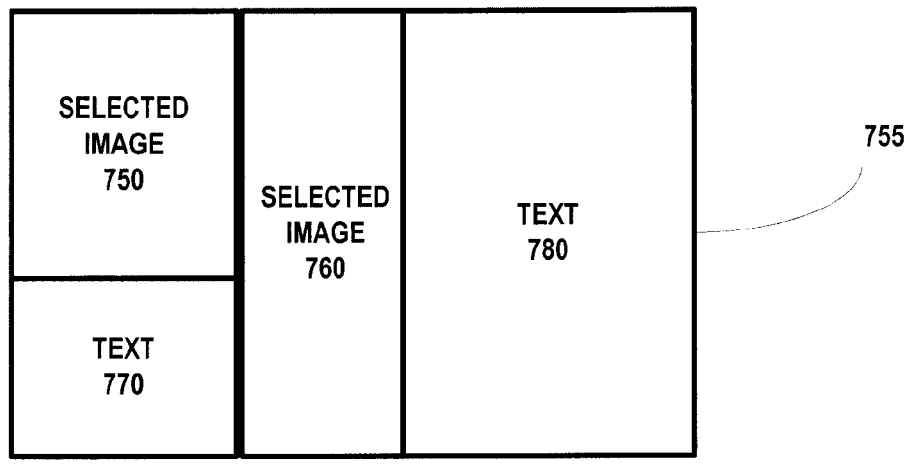

FIG. 7A to FIG. 7C illustrate different examples of presentation layouts in which selected pictures may appear with text items. In FIG. 7A, a selected image 710 and a text summary 720 are displayed next to each other in a given presentation. The text summary 720 may be an extraction or other abbreviation of an underlying article. Alternatively, the entire article may be displayed. According to one embodiment, the selected image 710 has a rightward orientation, to face the text summary on the right 720. Alternatively, the directional orientation of the selected image may be neutral (e.g. dead-on). The positioning of the image 710 next to the text item be immediately next to one another, so as to be appear to be "touching", or spaced-apart. For example, the selected text summary 720 and the selected image 710 may share a horizontal section on a given page.

FIG. 7B illustrates a reverse arrangement in which a text summary 730 is provided to the left of a selected image 740. Such an arrangement may require the use of a left-slanted image, or one that is neutral in slant.

FIG. 7C illustrates a newspaper type layout 755, in which text and images are not necessarily summarized or reduced, but provided in substantive form. A more complicated layout information may be used to align pictures 750 and 760 with text items 770 and 780. As shown by FIG. 7C, the text items 770 and 780 are not summarizations, but substantive in portion. For example, the text items 770 and 780 may have multiple columns and/or contain the entire article. Likewise, the pictures 750 and 760 may not necessarily be reductions, or large reductions, but large and rich.

Alternative Embodiments and Implementations

While embodiments described herein focus on presenting images with articles, other embodiments may incorporate other context. For example, images may be advertisement media, such as iconic displays representing advertisement material. The text content may correspond to text appearing on a web page or network site. Thus, advertisement selection may be made through an understanding of the content on the article and the content of the image.

Further, while embodiments described above contemplate an online environment, one or more embodiments described herein may be implemented through client-software, or other kinds of software, such as shareware. An embodiment also provides that the presentation may be in the form of a hard-copy, such as a paper or print document. For example, one or more embodiments may be used to select pictures for a hard print newspaper, journal or magazine.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for selecting pictures for use with text items in creating presentations, the method comprising:

identifying information about individual pictures in a collection of pictures, the information including (i) content information that identifies one or more topics associated with each of the pictures in the collection, and (ii) layout information associated with each of the pictures in the collection;

identifying one or more requirements or conditions for use in selecting a given picture from the collection of pictures, the one or more requirements indicating a desired picture layout information, including implementing one or more rules that govern the appearance of pictures in a layout that includes one or more text items;

identifying information about a content of the one or more text items;

programmatically selecting the given picture from the collection of pictures;

wherein programmatically selecting the given picture is based at least in part on the information about the one or more text items and the content information identified about the given picture;

wherein programmatically selecting the given picture includes using the layout information of the given picture to determine that the given picture satisfies the one or more requirements or conditions;

wherein programmatically selecting a given picture from the collection of pictures further includes selecting one or more candidate pictures based at least in part on the information about the one or more text items and the content information of the given picture;

determining which, if any, of the one or more candidate pictures are to be used with the one or more text items based on a set of rules governing a usage of the pictures in the collection;

wherein identifying information about individual pictures in a collection of pictures includes identifying respective slant information indicating a slant orientation of an object appearing in at least a portion of a respective one of the pictures in the collection;

wherein implementing the one or more rules includes implementing one or more rules that govern the appearance of pictures based on the slant orientation of the pictures;

wherein determining which, if any, of the one or more candidate pictures are to be used with the text item includes determining the slant orientation of one or more a candidate pictures; and providing the presentation using the text item and the given picture according to the determined layout for the presentation.

2. The method of claim 1, wherein determining which, if any, of the candidate pictures are to be used includes determining a position on the presentation where the given picture is to be displayed, and disqualifying one or more candidate pictures because the slant orientation of an object appearing in those pictures is not directed towards the text item if the candidate picture is displayed at the candidate position.

3. A computer-implemented method for selecting a picture for use with a text item in creating a presentation, the method comprising:

programmatically analyzing each of a plurality of image files to identify association data for each image file in a collection of image files;

identifying information about a content of the text item;

programmatically selecting a given image file from the collection of image files based at least in part on the information about the text item and the association data of the given image file;

creating a presentation based on the text item and the given image file; and wherein programmatically analyzing each of a plurality of image files includes programmatically analyzing a slant of an object in individual image files in order to determine association data that includes data about the slant of the object, and wherein programmatically selecting a given image file is based at least in part on the slant of a given object in the given image file.

4. A method for selecting images for use with an article on a web page, the method comprising:

programmatically analyzing text contained within each of a plurality of image files in order to identify one or more categories for individual image files that comprise the collection;

selecting, from a plurality of text items, one or more text items for use in a presentation that is to include at least one image from a corresponding image file;

determining one or more categories for each of the plurality of text items;

programmatically selecting, for the presentation, a given image file from the collection of image files based at least in part on a comparison of the identified one or more categories of individual image files with one or more categories of the given text item;

identifying layout information about an image of one or more of the individual image files, and wherein programmatically selecting the given image file is based in part on determining that the image of the image file conforms to a condition or requirement of the layout for the presentation;

including the given image file with the one or more text items as part of the presentation; and wherein the condition or requirement of the layout corresponds to a specified slant of an object in the image file.

5. A computer-implemented method for selecting a given image from a plurality of images for use with one or more text items in creating a presentation, the method comprising:

identifying respective image layout information associated with each of the plurality of images;

determining a layout for a presentation that is to include the one or more text items;

identifying, based on the determined layout for the presentation, one or more requirements or conditions for use in selecting the given image from the plurality of images, the one or more requirements indicating a desired image layout information;

programmatically selecting the given image from the plurality of images using the image layout information associated with the given image to determine that the given image satisfies the one or more requirements or conditions;

wherein identifying respective image layout information includes identifying respective slant information indicating a slant orientation of an object in a respective one of the pictures the collection; and providing the presentation using the one or more text items and the given image according to the determined layout for the presentation.

6. The method of claim 5, wherein programmatically selecting a given image from the plurality of images further includes:

identifying information about a content of the one or more text items;

identifying content information that indicates one or more topics associated with each of the plurality of images;

selecting one or more candidate images based at least in part on the information about the one or more text items and the content information of the given image;

determining which, if any, of the one or more candidate images are to be used with the one or more text items based on a set of rules governing a usage of the plurality of images.

7. The method of claim 6, wherein identifying, based on the determined layout for a presentation, one or more requirements or conditions includes implementing one or more rules that govern the appearance of images in the presentation, and wherein determining which, if any, of the one or more candidate images are to be used with the one or more text items includes disqualifying one of the one or more candidate pictures based on the one or more rules that govern the appearance of images in the determined layout.

8. The method of claim 7, wherein implementing the one or more rules includes implementing one or more rules that govern the appearance of images based on the slant orientation of the images, and and wherein determining which, if any, of the one or more candidate images are to be used with the one or more text items includes determining the slant orientation of one or more candidate images.

9. The method of claim 8, wherein determining which, if any, of the candidate images are to be used includes determining a position on the presentation where the given image is to be displayed, and disqualifying one or more candidate images because the slant orientation of an object appearing in those images is not directed towards the text item if the candidate image is displayed at the determined position.

* * * * *